United States Patent
Ohara (10) Patent No.: US 11,186,251 B2
(45) Date of Patent: Nov. 30, 2021

(54) AIRBAG DEVICE

(71) Applicant: Toyota Jidosha Kabushiki Kaisha, Toyota Aichi-ken (JP)

(72) Inventor: Koji Ohara, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 16/703,107

(22) Filed: Dec. 4, 2019

(65) Prior Publication Data

US 2020/0180547 A1 Jun. 11, 2020

(30) Foreign Application Priority Data

Dec. 7, 2018 (JP) .............................. JP2018-230232

(51) Int. Cl.
| | |
|---|---|
| *B60R 21/261* | (2011.01) |
| *B60R 21/231* | (2011.01) |
| *B60R 21/205* | (2011.01) |
| *B60R 21/232* | (2011.01) |

(52) U.S. Cl.
CPC .......... *B60R 21/261* (2013.01); *B60R 21/205* (2013.01); *B60R 21/232* (2013.01); *B60R 21/23138* (2013.01); *B60R 2021/23107* (2013.01); *B60R 2021/2615* (2013.01)

(58) Field of Classification Search
None
See application file for complete search history.

(56) References Cited

U.S. PATENT DOCUMENTS

| | | | |
|---|---|---|---|
| 5,529,337 A | 6/1996 | Takeda et al. | |
| 8,764,053 B1 * | 7/2014 | Dix ........................ | B60R 21/232 280/730.1 |
| 8,876,153 B2 * | 11/2014 | Dix ........................ | B60R 21/203 280/729 |
| 9,845,067 B2 * | 12/2017 | Morris .................. | B60R 21/239 |
| 9,994,184 B2 * | 6/2018 | Deng .................. | B60R 21/0136 |
| 10,065,593 B2 * | 9/2018 | Choi ..................... | B60R 21/232 |
| 2003/0116945 A1 * | 6/2003 | Abe ....................... | B60R 21/231 280/729 |
| 2005/0035577 A1 * | 2/2005 | Barko ..................... | B60R 21/33 280/730.2 |
| 2006/0006631 A1 | 1/2006 | Meissner et al. | |

(Continued)

FOREIGN PATENT DOCUMENTS

| | | |
|---|---|---|
| JP | H07156740 A | 6/1995 |
| JP | H08324373 A | 12/1996 |

(Continued)

*Primary Examiner* — Faye M Fleming
(74) *Attorney, Agent, or Firm* — Dinsmore & Shohl LLP (57) ABSTRACT

An airbag device includes a curtain airbag that is inflated by gas supplied to an inside of the curtain airbag, and that is configured to be deployed to a vehicle width direction outer side of an occupant seated in a vehicle seat, a main airbag that is inflated by gas supplied to an inside of the main airbag, and that is configured to be deployed from an instrument panel side to a front side of the occupant seated in the vehicle seat, and an auxiliary airbag that is inflated by gas supplied to an inside of the auxiliary airbag, and that is configured to be deployed between a vehicle width direction inner portion of the main airbag and an instrument panel.

20 Claims, 4 Drawing Sheets

(56) References Cited

U.S. PATENT DOCUMENTS

| | | | |
|---|---|---|---|
| 2014/0203541 A1* | 7/2014 | Wei | B60R 21/233 |
| | | | 280/730.2 |
| 2016/0046257 A1 | 2/2016 | Yamada et al. | |
| 2017/0072896 A1* | 3/2017 | Fukawatase | B60R 21/232 |
| 2017/0158154 A1 | 6/2017 | Kobayashi et al. | |
| 2017/0355346 A1 | 12/2017 | Kobayashi | |
| 2018/0326939 A1* | 11/2018 | Jung | B60R 21/213 |
| 2018/0354450 A1* | 12/2018 | Yamada | B60R 21/23138 |
| 2019/0193668 A1* | 6/2019 | Hayashi | B60R 21/231 |
| 2020/0079315 A1* | 3/2020 | Hioda | B60R 21/232 |

FOREIGN PATENT DOCUMENTS

| | | |
|---|---|---|
| JP | 2006-508862 A | 3/2006 |
| JP | 2016-040155 A | 3/2016 |
| JP | 2017-100685 A | 6/2017 |
| JP | 2017-222185 A | 12/2017 |
| JP | 2017-226395 A | 12/2017 |

\* cited by examiner

AIRBAG DEVICE

CROSS-REFERENCE TO RELATED APPLICATION

This application claims priority under 35 USC 119 from Japanese Patent Application No. 2018-230232, filed on Dec. 7, 2018, the disclosure of which is incorporated by reference herein in its entirety.

BACKGROUND

Technical Field

The present disclosure relates to an airbag device.

Related Art

Japanese Patent Application Laid-open (JP-A) No. 2017-222185 discloses an airbag device including a main bag portion, which is deployed to a seat front side of an occupant seated in a vehicle seat, and a center bag portion, which projects rearward from a vehicle width direction inner side of the main bag portion. In the airbag device described in this document, when the vehicle sustains an oblique impact on a driver's seat side, the head of the occupant that moves in a vehicle forward direction and inward in a vehicle width direction becomes disposed in a slit formed between the main bag portion and the center bag portion, whereby the rotational injury criterion of the head of the occupant can be reduced.

Furthermore, JP-A No. H08-324373 discloses an airbag device including an airbag, which is deployed to a seat front side of an occupant seated in a vehicle seat, and a pair of projecting portions, which project rearward from both vehicle width direction side portions of the airbag. In the airbag device described in this document, when the vehicle sustains an oblique impact, a head of the occupant that moves in a vehicle forward direction and inward in a vehicle width direction comes into abutting contact with the projecting portions, whereby the head of the occupant can be restrained.

SUMMARY

In a configuration including a curtain airbag that is deployed at a vehicle width direction outer side of an occupant seated in a vehicle seat, when the curtain airbag that has deployed and an airbag that has deployed to a front side of the occupant come into abutting contact with each other, it is conceivable for the airbag that has deployed to the front side of the occupant to be displaced inward in a vehicle width direction, but the configurations described in JP-A No. 2017-222185 and JP-A No. H08-324373 do not take such a case into account.

In consideration of the above circumstances, the present disclosure obtains an airbag device that can inhibit displacement, inward in the vehicle width direction, of an airbag that has come into abutting contact with a curtain airbag.

An airbag device of a first aspect of the disclosure includes a curtain airbag that is inflated by gas supplied to an inside of the curtain airbag, and that is configured to be deployed to a vehicle width direction outer side of an occupant seated in a vehicle seat, a main airbag that is inflated by gas supplied to an inside of the main airbag, and that is configured to be deployed from an instrument panel side to a front side of the occupant seated in the vehicle seat, and an auxiliary airbag that is inflated by gas, supplied to an inside of the auxiliary airbag, and that is configured to be deployed between a vehicle width direction inner portion of the main airbag and an instrument panel.

According to the airbag device of the first aspect, the curtain airbag inflates by gas supplied to the inside of the curtain airbag, and the curtain airbag is configured to be deployed to the vehicle width direction outer side of the occupant seated in the vehicle seat.

Furthermore, the main airbag inflates by gas supplied to the inside of the main airbag, and the main airbag is configured to be deployed from the instrument panel side to the front side of the occupant seated in the vehicle seat.

Moreover, the auxiliary airbag inflates by gas supplied to the inside of the auxiliary airbag, and the auxiliary airbag is configured to be deployed between the vehicle width direction inner portion of the main airbag and the instrument panel.

When the curtain airbag and the main airbag, each inflating and deploying, come into abutting contact with each other, it is conceivable for the main airbag to be displaced inward in the vehicle width direction. However, in the airbag device of the first aspect, displacement of the main airbag inward in the vehicle width direction can be regulated by the auxiliary airbag. Displacement, inward in the vehicle width direction, of the main airbag that has come into abutting contact with the curtain airbag can be inhibited.

An airbag device of a second aspect of the disclosure is the airbag device of the first aspect, wherein the main airbag includes a center portion opposing, in a seat front and rear direction, the occupant seated in the vehicle seat, and projecting portions that project in a seat rearward direction from both end portions in a vehicle width direction of the center portion.

According to the airbag device of the second aspect, the main airbag includes projecting portions, and it is easy for the projecting portion at the vehicle width direction outer side to come into abutting contact with the curtain airbag. However, in the airbag device of the second aspect, when the projecting portion at the vehicle width direction outer side of the main airbag comes into abutting contact with the curtain airbag, displacement of the main airbag inward in the vehicle width direction can be regulated by the auxiliary airbag.

An airbag device of a third aspect of the disclosure is the airbag device of the first aspect or the second aspect, wherein the main airbag is symmetrical in the vehicle width direction.

In a configuration where the main airbag is not symmetrical in the vehicle width direction by eliminating the projecting portion at the vehicle width direction outer side to avoid abutment with the curtain airbag, it is easy for the main airbag to swing in the vehicle width direction when the main airbag inflates. However, according to the airbag device of the third aspect, since the main airbag is symmetrical in the vehicle width direction, the main airbag can be inhibited from swinging in the vehicle width direction when the main airbag inflates.

An airbag device of a fourth aspect of the disclosure is the airbag device of any of the first aspect to the third aspect, wherein a volume of the auxiliary airbag is smaller than a volume of the main airbag, and gas generated by an inflator is supplied via a common flow regulating portion to the inside of the auxiliary airbag and the inside of the main airbag.

According to the airbag device of the fourth aspect, the volume of the auxiliary airbag is smaller than the volume of the main airbag, and gas generated by the inflator is supplied via the common flow regulating portion to the inside of the auxiliary airbag and the inside of the main airbag. The auxiliary airbag can be inflated earlier than the main airbag. Displacement of the main airbag inward in the vehicle width direction can be more reliably regulated by the auxiliary airbag.

An airbag device of a fifth aspect of the disclosure is the airbag device of the fourth aspect, wherein a check valve that allows flow of the gas from the flow regulating portion to the auxiliary airbag and that cuts off flow of the gas from the auxiliary airbag to the flow regulating portion is provided between the auxiliary airbag and the flow regulating portion.

According to the airbag device of the fifth aspect, because the check valve is provided between the auxiliary airbag and the flow regulating portion, the pressure of the gas in the auxiliary airbag can be maintained. Displacement of the main airbag inward in the vehicle width direction can be more reliably regulated by the auxiliary airbag.

The airbag device of the disclosure has the excellent effect that it can inhibit displacement, inward in the vehicle width direction, of an airbag that has come into abutting contact with a curtain airbag.

DETAILED DESCRIPTION

An airbag device 10 pertaining to an embodiment of the disclosure will be described using FIG. 1 to FIG. 3. Arrow FR appropriately shown in the drawings indicates a forward direction in a vehicle front and rear direction, arrow UP indicates an upward direction in a vehicle up and down direction, arrow RH indicates a rightward direction in a vehicle width direction as seen from the perspective of a seated occupant, and arrow LH indicates a leftward direction in the vehicle width direction. Below, when description is given simply using the directions of front/rear, right/left, and upper/lower, unless otherwise specified these will be understood to mean front/rear in the vehicle front and rear direction, right/left in the vehicle right and left direction (the vehicle width direction), and upper/lower in the vehicle up and down direction.

Figure 1:
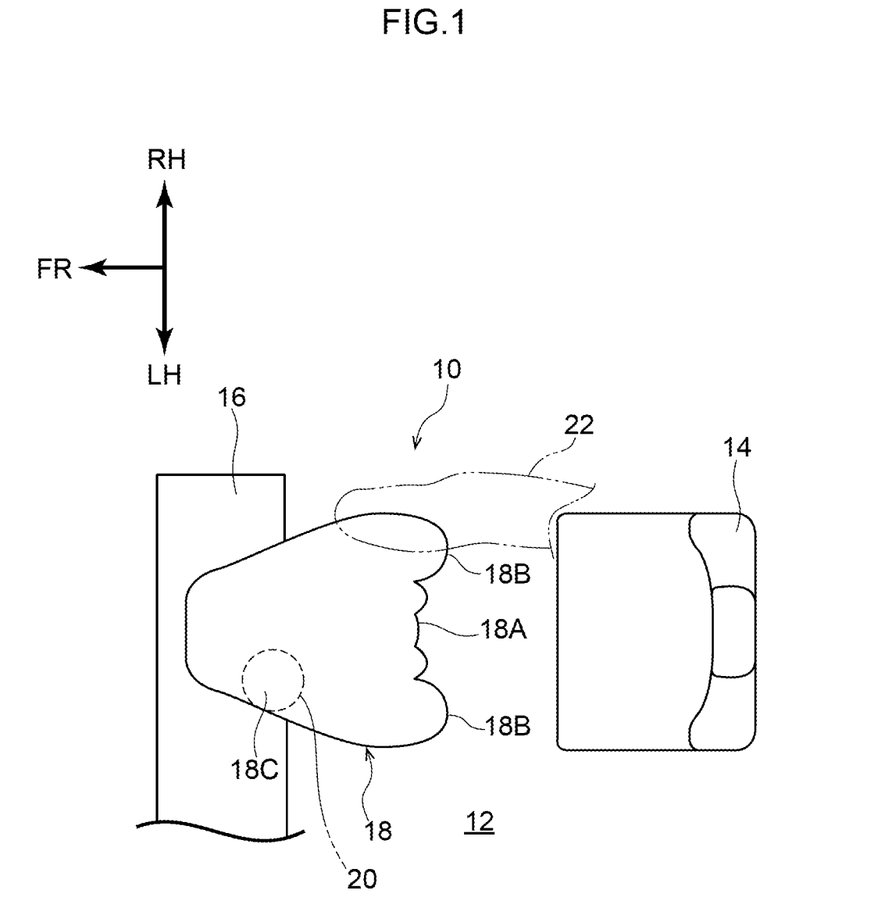
FIG. 1 is a plan view, seen from a vehicle upper side, schematically showing an airbag device of an embodiment of the disclosure.

As shown in FIG. 1, the airbag device 10 of the present embodiment is for restraining, at the time of an impact to the vehicle, an occupant seated in a front passenger seat 14 provided at a right side of a cabin 12. A driver's seat not shown in the drawings is provided at a left side of the front passenger seat 14 in the cabin 12.

The airbag device 10 includes a main airbag 18 and an auxiliary airbag 20, which are configured to be deployed from an instrument panel 16 provided at a front side of the front passenger seat 14, and a curtain airbag 22, which is configured to be deployed from a vehicle width direction outer side (the right side) of the occupant seated in the front passenger seat 14.

The curtain airbag 22 is formed as a bag shape that is inflated by gas, which is generated by an inflator not shown in the drawings, being supplied to an inside of the curtain airbag 22. When the curtain airbag 22 is deployed, the curtain airbag 22 becomes disposed between the occupant seated in the front passenger seat 14 and an occupant seated at a right side of a rear seat and right side glasses not shown in the drawings.

The main airbag 18 is formed as a bag shape that is inflated by gas that is generated by a front passenger seat inflator (not shown in the drawings), which is provided independently of the inflator that inflates the curtain airbag 22, being supplied to an inside of the main airbag 18. The main airbag 18 includes a center portion 18A that is opposing, in the front and rear direction, the occupant (the head of the occupant) seated in the front passenger seat 14 and a right and left pair of projecting portions 18B that project rearward from a left-side end portion and a right-side end portion of the center portion 18A. In the present embodiment, the shape of the main airbag 18 after complete deployment is symmetrical in the seat width direction.

Figure 2:
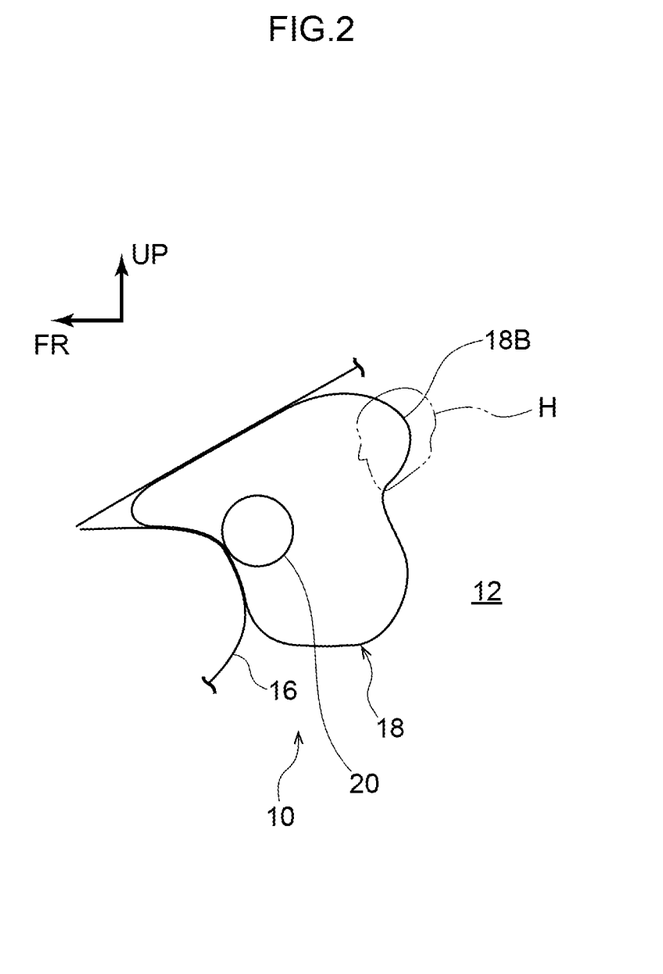
FIG. 2 is a side view, seen from a vehicle left side, schematically showing the airbag device of the embodiment.

As shown in FIG. 1 and FIG. 2, the auxiliary airbag 20 is formed as a spherical bag shape that is inflated by some of the gas generated by the inflator that inflates the main airbag 18 being supplied to an inside of the auxiliary airbag 20. When the auxiliary airbag 20 is deployed, the auxiliary airbag 20 becomes disposed between a portion 18C of the main airbag 18 and the instrument panel 16. The portion 18C of the main airbag 18 is located at a front and rear direction middle part and at a vehicle width direction inner side of the main airbag 18. Furthermore, in the present embodiment, the volume of the auxiliary airbag 20 is set smaller than the volume of the main airbag 18. Because of this, the leak amount of the gas in the auxiliary airbag 20 (the amount that leaks from the surface and seam) is smaller than the leak amount of the gas in the main airbag 18 (the amount that leaks from the surface and seam).

Figure 3:
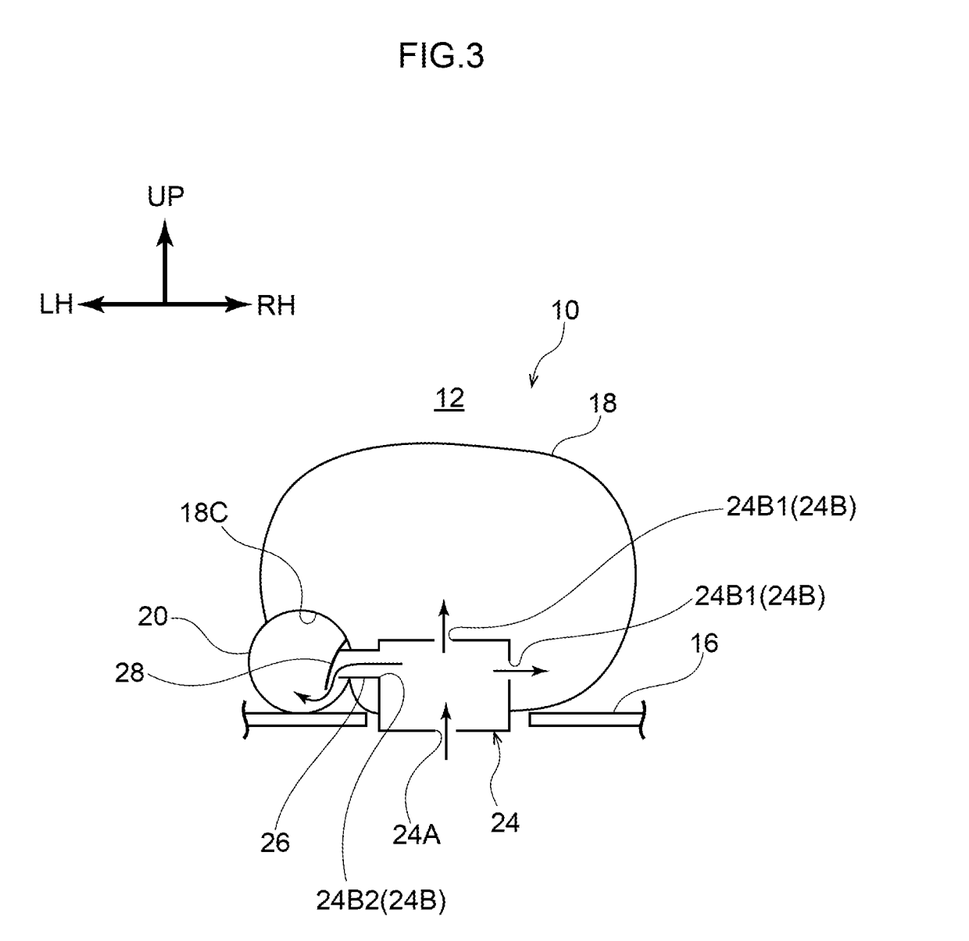
FIG. 3 is a back sectional view, seen from a vehicle rear side, schematically showing the airbag device of the embodiment.

As shown in FIG. 3, a flow regulating cloth 24 is joined by sewing, for example, to an end portion of the main airbag 18 at a side where the gas from the inflator is supplied. The flow regulating cloth 24 is for regulating the flow of the gas from the inflator and supplying the gas to the main airbag 18 and the auxiliary airbag 20.

Formed in the flow regulating cloth 24 are an inflow hole 24A, into which flows the gas from the inflator, and plural outflow holes 24B, out from which flows the gas that has flowed into the flow regulating cloth 24 from the inflow hole 24A. Predetermined outflow holes 24B1 of the plural outflow holes 24B communicate with the inside of the main airbag 18. An outflow hole 24B2, which does not communicate with the inside of the main airbag 18, of the plural outflow holes 24B communicates with the inside of the auxiliary airbag 20 via a conduit 26 formed in a tubular shape.

A reed valve 28 serving as a check valve is provided at an auxiliary airbag 20 side in the conduit 26 that interconnects the auxiliary airbag 20 and the flow regulating cloth 24. The reed valve 28 is attached by sewing, for example, to the auxiliary airbag 20 and opens and closes an end portion at the auxiliary airbag 20 side of the conduit 26. Because the reed valve 28 is provided, flow of the gas from the flow regulating cloth 24 to the auxiliary airbag 20 is allowed, but flow of the gas from the auxiliary airbag 20 to the flow regulating cloth 24 is cut off. Since the reed valve 28 is provided and the leak amount of the gas in the auxiliary airbag 20 is smaller than the leak amount of the gas in the main airbag 18, a pressure of the gas in the auxiliary airbag 20 becomes higher than a pressure of the gas in the main airbag 18 after the inflation of the main airbag 18 and the auxiliary airbag 20.

Action and Effects of Present Embodiment

The action and effects of the present embodiment will be described.

As shown in FIG. 1, FIG. 2, and FIG. 3, when the vehicle including the airbag device 10 of the present embodiment sustains a frontal impact, predetermined inflators generate gas. "Fontal impact" refers to a full overlap impact, an offset impact, a small overlap impact, or an oblique impact.

The gas generated by one inflator is supplied to the inside of the curtain airbag 22. The curtain airbag 22 inflates and becomes deployed between the occupant seated in the front passenger seat 14 and the right side glass not shown in the drawings.

Furthermore, as shown in FIG. 3, the gas generated by the inflator for the front passenger seat flows into the flow regulating cloth 24 from the inflow hole 24A. Additionally, some of the gas that has flowed into the flow regulating cloth 24 is supplied via the outflow holes 24B1 to the inside of the main airbag 18. Because of this, the main airbag 18 inflates and becomes deployed to the front side of the occupant seated in the front passenger seat 14 (see FIG. 1).

Moreover, another some of the gas that has flowed into the flow regulating cloth 24 is supplied via the outflow hole 24B2 and the conduit 26 to the inside of the auxiliary airbag 20. Because of this, the auxiliary airbag 20 inflates and becomes deployed between the portion 18C of the main airbag 18 in the deployed state and the instrument panel 16. The portion 18C is located at the front and rear direction middle part and at the vehicle width direction inner side of the main airbag 18.

As shown in FIG. 1, in a configuration where the main airbag 18 and the curtain airbag 22 become deployed respectively on the front side and the vehicle width direction outer side of the front passenger seat 14, it is conceivable for the curtain airbag 22 and the main airbag 18 to come into abutting contact with each other and for the main airbag 18 to be displaced inward in the vehicle width direction. However, in the present embodiment, displacement of the main airbag 18 inward can be regulated by the auxiliary airbag 20. Displacement, inward in the vehicle width direction, of the main airbag 18 that has come into abutting contact with the curtain airbag 22 can be inhibited. As a result, the head H of the occupant that moves obliquely forward at the time of an oblique impact to the vehicle can be appropriately restrained by the projecting portions 18B, and the rotational injury criterion of the head H of the occupant can be reduced.

In a configuration where the main airbag 18 includes the right and left pair of projecting portions 18B, it is easy for the projecting portion 18B on the vehicle width direction outer side to come into abutting contact with the curtain airbag 22. However, in the present embodiment, when the projecting portion 18B on the vehicle width direction outer side comes into abutting contact with the curtain airbag 22, displacement of the main airbag 18 inward in the vehicle width direction can be regulated by the auxiliary airbag 20.

In a configuration that does not have the projecting portion 18B on the vehicle width direction outer side so as to avoid abutment with the curtain airbag 22, that is, in a configuration where the main airbag 18 is not symmetrical in the vehicle width direction, it is easy for the main airbag 18 to swing in the vehicle width direction when the main airbag 18 inflates. However, in the present embodiment, the main airbag 18 is symmetrical in the vehicle width direction, accordingly, the main airbag 18 can be inhibited from swinging in the vehicle width direction when the main airbag 18 inflates.

Furthermore, in the present embodiment, the volume of the auxiliary airbag 20 is configured to be smaller than the volume of the main airbag 18, and the gas generated by the inflator is supplied via the common flow regulating cloth 24 to the inside of the auxiliary airbag 20 and the inside of the main airbag 18. Because of this, the auxiliary airbag 20 can be inflated earlier than the main airbag 18. As a result, displacement of the main airbag 18 inward in the vehicle width direction can be more reliably regulated by the auxiliary airbag 20.

Moreover, in the present embodiment, because the reed valve 28 is provided, the pressure of the gas in the auxiliary airbag 20 becomes higher than the pressure of the gas in the main airbag 18 after the inflation of the main airbag 18 and the auxiliary airbag 20. Because of this, displacement of the main airbag 18 inward in the vehicle width direction can be more reliably regulated by the auxiliary airbag 20.

Figure 4:
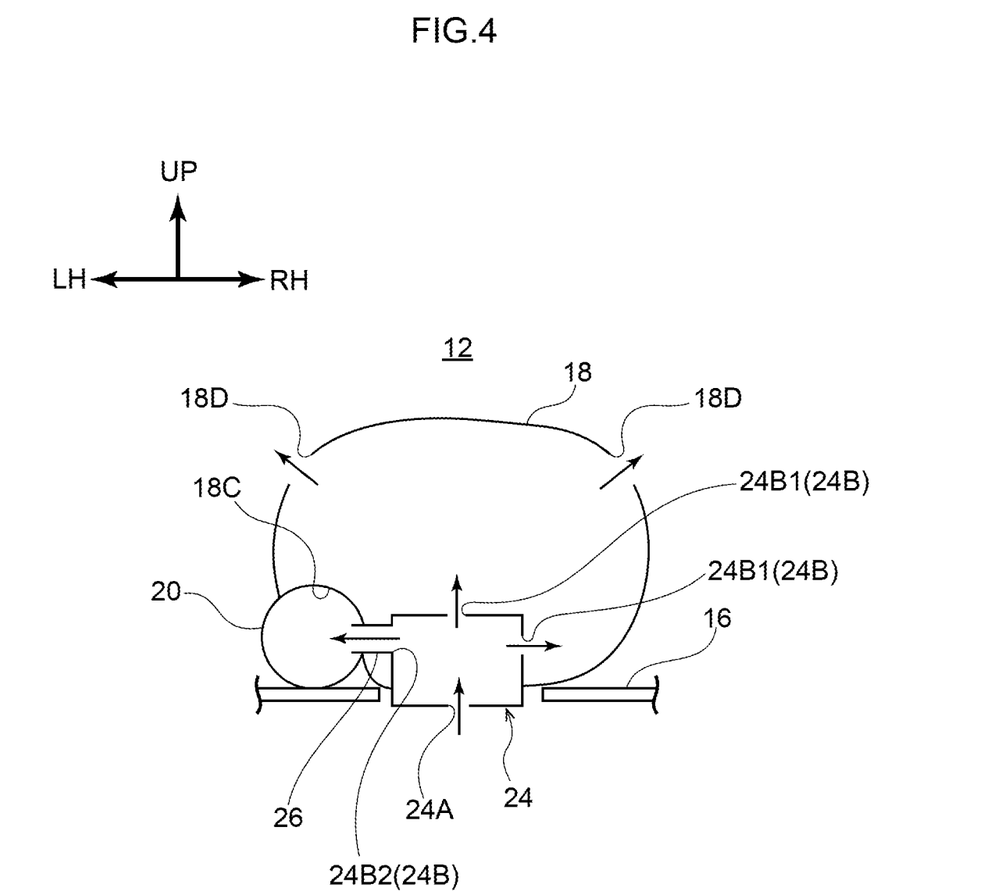
FIG. 4 is a back sectional view, corresponding to FIG. 3, schematically showing an airbag device of another embodiment.

It will be noted that although in the present embodiment an example is described where the airbag device is configured in such a way that, by providing the reed valve 28, the pressure of the gas in the auxiliary airbag 20 after inflation becomes higher than the pressure of the gas in the main airbag 18, the disclosure is not limited to this. For example, as shown in FIG. 4, the airbag device may also be configured in such a way that, by forming vent holes 18D in the main airbag 18 and not providing the reed valve 28, the pressure of the gas in the auxiliary airbag 20 becomes higher than the pressure of the gas in the main airbag 18 after the inflation of the main airbag 18 and the auxiliary airbag 20.

Furthermore, in the present embodiment, an example is described where the gas generated by the inflator is supplied via the common flow regulating cloth 24 to the inside of the auxiliary airbag 20 and the inside of the main airbag 18, but the disclosure is not limited to this. For example, the airbag device may also be configured in such a way that gas generated by two inflators is supplied respectively to the inside of the auxiliary airbag 20 and the inside of the main airbag 18.

Moreover, in the present embodiment, an example is described where the shape of the main airbag 18 after complete deployment is configured to be symmetrical in the seat width direction, but the disclosure is not limited to this. It suffices to appropriately set the shape of the main airbag 18 after deployment in consideration of the trajectory of movement of the body of the occupant at the time of an impact to the vehicle. Furthermore, in the same way it suffices to appropriately set whether or not to provide the projecting portions 18B in the main airbag 18.

An embodiment of the disclosure has been described above, but the disclosure is not limited to what is described above and can of course be modified and implemented in a variety of ways, in addition to what is described above, in a range that does not depart from the spirit thereof.

What is claimed is:

1. An airbag device comprising:
   a curtain airbag that is inflated by gas supplied to an inside of the curtain airbag, and that is configured to be deployed to a vehicle width direction outer side of an occupant seated in a vehicle seat;

a main airbag that is inflated by gas supplied to an inside of the main airbag, and that is configured to be deployed from an instrument panel side to a front side of the occupant seated in the vehicle seat; and an auxiliary airbag that is inflated by gas supplied to an inside of the auxiliary airbag, and that is configured to be deployed between a vehicle width direction inner portion of the main airbag and an instrument panel, wherein the airbag device is for a front passenger seat and is configured to be deployed from the instrument panel provided at a front side of the front passenger seat.

2. The airbag device according to claim 1, wherein the main airbag includes:

a center portion opposing, in a seat front and rear direction, the occupant seated in the front passenger seat, and projecting portions projecting in a seat rearward direction from both end portions in the vehicle width direction of the center portion.

3. The airbag device according to claim 1, wherein the main airbag is symmetrical in the vehicle width direction.

4. The airbag device according to claim 1, wherein:

a volume of the auxiliary airbag is smaller than a volume of the main airbag, and gas generated by an inflator is supplied via a common flow regulating portion to the inside of the auxiliary airbag and the inside of the main airbag.

5. The airbag device according to claim 4, wherein a check valve, which allows flow of the gas from the flow regulating portion to the auxiliary airbag and cuts off flow of the gas from the auxiliary airbag to the flow regulating portion, is provided between the auxiliary airbag and the flow regulating portion.

6. The airbag device according to claim 1, wherein the auxiliary airbag is formed as a spherical bag shape that is inflated by gas generated by an inflator.

7. The airbag device according to claim 4, wherein the flow regulating portion is formed with an inflow hole, into which the gas from the inflator flows, a first outflow hole, from which the gas that has flowed into the flow regulating portion flows into the main airbag, and a second outflow hole, which does not communicate with the inside of the main airbag and from which the gas flows into the auxiliary airbag via a conduit formed in a tubular shape.

8. The airbag device according to claim 7, wherein the check valve is a reed valve that is provided at an auxiliary airbag side in the conduit that interconnects the auxiliary airbag and the flow regulating portion.

9. An airbag device comprising:

a curtain airbag that is inflated by gas supplied to an inside of the curtain airbag, and that is configured to be deployed to a vehicle width direction outer side of an occupant seated in a vehicle seat;

a main airbag that is inflated by gas supplied to an inside of the main airbag, and that is configured to be deployed from an instrument panel side to a front side of the occupant seated in the vehicle seat; and an auxiliary airbag that is inflated by gas supplied to an inside of the auxiliary airbag, and that is configured to be deployed between a vehicle width direction inner portion of the main airbag and an instrument panel, wherein:

the airbag device is for a front passenger seat and is configured to be deployed from the instrument panel provided at a front side of the front passenger seat, the auxiliary airbag inflates and becomes deployed between a portion of the main airbag, which is located at a front and rear direction middle part and at a vehicle width direction inner side of the main airbag in the deployed state, and the instrument panel, and displacement of the deployed main airbag inward in the vehicle width direction is configured to be regulated by the deployed auxiliary airbag that is pressed toward substantially the front side of the occupant by the instrument panel.

10. The airbag device according to claim 9, wherein the main airbag includes:

a center portion opposing, in a seat front and rear direction, the occupant seated in the front passenger seat, and projecting portions projecting in a seat rearward direction from both end portions in the vehicle width direction of the center portion.

11. The airbag device according to claim 9, wherein the main airbag is symmetrical in the vehicle width direction.

12. The airbag device according to claim 9, wherein:

a volume of the auxiliary airbag is smaller than a volume of the main airbag, and gas generated by an inflator is supplied via a common flow regulating portion to the inside of the auxiliary airbag and the inside of the main airbag.

13. The airbag device according to claim 12, wherein a check valve, which allows flow of the gas from the flow regulating portion to the auxiliary airbag and cuts off flow of the gas from the auxiliary airbag to the flow regulating portion, is provided between the auxiliary airbag and the flow regulating portion.

14. The airbag device according to claim 9, wherein the auxiliary airbag is formed as a spherical bag shape that is inflated gas generated by an inflator.

15. The airbag device according to claim 12, wherein the flow regulating portion is formed with an inflow hole, into which the gas from the inflator flows, a first outflow hole, from which the gas that has flowed into the flow regulating portion flows into the main airbag, and a second outflow hole, which does not communicate with the inside of the main airbag and from which the gas flows into the auxiliary airbag via a conduit formed in a tubular shape.

16. The airbag device according to claim 15, wherein a reed valve serving as a check valve is provided at an auxiliary airbag side in the conduit that interconnects the auxiliary airbag and the flow regulating portion.

17. An airbag device comprising:

a curtain airbag that is inflated by gas supplied to an inside of the curtain airbag, and that is configured to be deployed to a vehicle width direction outer side of an occupant seated in a vehicle seat;

a main airbag that is inflated by gas supplied to an inside of the main airbag, and that is configured to be deployed from an instrument panel side to a front side of the occupant seated in the vehicle seat; and an auxiliary airbag that is inflated by gas supplied to an inside of the auxiliary airbag, and that is configured to be deployed between a vehicle width direction inner portion of the main airbag and an instrument panel, the auxiliary airbag is formed as a spherical bag shape.

18. The airbag device according to claim 17, wherein the main airbag includes:

a center portion opposing, in a seat front and rear direction, the occupant seated in the front passenger seat, and projecting portions projecting in a seat rearward direction from both end portions in the vehicle width direction of the center portion.

19. The airbag device according to claim 17, wherein the main airbag is symmetrical in the vehicle width direction.

20. The airbag device according to claim 17, wherein:
- a volume of the auxiliary airbag is smaller than a volume of the main airbag, and
- gas generated by an inflator is supplied via a common flow regulating portion to the inside of the auxiliary airbag and the inside of the main airbag.

* * * * *